(12) United States Patent
Thirumalai et al.

(10) Patent No.: US 12,395,327 B2
(45) Date of Patent: Aug. 19, 2025

(54) TECHNIQUES FOR USER ACCOUNT AND DATA RECOVERY

(71) Applicant: Apple Inc., Cupertino, CA (US)

(72) Inventors: Gokul P. Thirumalai, Mountain View, CA (US); Alexandre A. Aybes, San Francisco, CA (US); Dmitry V. Belov, Santa Clara, CA (US); Jean-Luc Giraud, Melbourn (GB); Kalyan C. Gopavarapu, Sunnyvale, CA (US); Sudhakar N. Mambakkam, Saratoga, CA (US); Rebekah H. Mercer, Santa Cruz, CA (US); Keaton F. Mowery, Redwood City, CA (US); Steven A. Myers, San Jose, CA (US); Munish K. Poonia, San Jose, CA (US); Nihar Sharma, Detroit, MI (US); Assar E. Westerlund, Somerville, MA (US); Frederic Jacobs, St. Sulpice (CH)

(73) Assignee: Apple Inc., Cupertino, CA (US)

( * ) Notice: Subject to any disclaimer, the term of this patent is extended or adjusted under 35 U.S.C. 154(b) by 664 days.

(21) Appl. No.: 17/649,924

(22) Filed: Feb. 3, 2022

(65) Prior Publication Data
US 2022/0393867 A1    Dec. 8, 2022

Related U.S. Application Data

(60) Provisional application No. 63/197,465, filed on Jun. 6, 2021.

(51) Int. Cl.
*H04L 9/08* (2006.01)
*G06F 21/60* (2013.01)

(52) U.S. Cl.
CPC .......... *H04L 9/0861* (2013.01); *G06F 21/602* (2013.01)

(58) Field of Classification Search
CPC ... H04L 9/0861; H04L 9/0643; H04L 9/0894; G06F 21/602; G06F 21/604; G06F 21/34;
(Continued)

(56) References Cited

U.S. PATENT DOCUMENTS

| | | | |
|---|---|---|---|
| 7,610,491 B1 * | 10/2009 | Tsao | G06F 21/31 713/184 |
| 2016/0140335 A1 * | 5/2016 | Proulx | H04L 9/0863 726/6 |

(Continued)

OTHER PUBLICATIONS

Zhu et al., "A Proposal For Account Recovery in Decentralized Applications", Jul. 2019, IEEE International Conference on Blockchain, pp. 148-155 (Year: 2019).*

*Primary Examiner* — Kenneth W Chang
(74) *Attorney, Agent, or Firm* — DICKINSON WRIGHT RLLP

(57) ABSTRACT

This Application sets forth techniques for establishing a custodial relationship between a user device and a custodian device for recovering access to a user account and/or to encrypted user data with assistance provided by the custodian device to effect access recovery. A server of a cloud network service provides an anonymous identifier to associate with the custodian device and an account recovery key to store at the custodian device. Identity of an account of the cloud network service associated with the custodian device can be hidden from the server. The user device generates a data recovery key and provides a first portion of the data recovery key to the custodian device and a second portion of the data recovery key to the server. Integrity of the stored account recovery key and portions of the data recovery key are checked regularly by the custodian device and the user device.

20 Claims, 12 Drawing Sheets

(58) Field of Classification Search
CPC ............. G06F 21/64; G06F 2221/2115; G06F 2221/2131
See application file for complete search history.

(56) References Cited

U.S. PATENT DOCUMENTS

| | | | |
|---|---|---|---|
| 2016/0352518 A1* | 12/2016 | Ford | G06F 21/6218 |
| 2016/0359863 A1* | 12/2016 | Krstic | G06F 21/45 |
| 2017/0142082 A1* | 5/2017 | Qian | G06F 21/62 |
| 2017/0250972 A1* | 8/2017 | Ronda | H04L 9/0891 |
| 2019/0013942 A1* | 1/2019 | Brown | H04L 9/3226 |
| 2019/0207756 A1* | 7/2019 | Vass | H04L 9/0863 |

* cited by examiner

TECHNIQUES FOR USER ACCOUNT AND DATA RECOVERY

CROSS-REFERENCE TO RELATED APPLICATIONS

The present application claims the benefit of U.S. Provisional Application No. 63/197,465, entitled "TECHNIQUES FOR USER ACCOUNT AND DATA RECOVERY," filed Jun. 6, 2021, the content of which is incorporated herein by reference in its entirety for all purposes.

FIELD

The described embodiments relate generally to online security. More particularly, the present embodiments relate to a technique for recovering access to a user account and/or to encrypted user data. Account and data recovery can be assisted by a custodian device.

BACKGROUND

The Internet provides an elastic platform for enabling many different types of services to be implemented for a large variety of different client devices. Service providers can implement services, accessible over the Internet, to perform a plethora of different tasks. Many services require authentication to provide security for account access, and additionally, data associated with the service may be encrypted to ensure data privacy.

A service provider that creates and manages a large number of user accounts is likely to implement security protocols for access to a user account. In some instances, a security protocol can require a user to authenticate themselves by entering credentials (e.g., a username and password) corresponding to the user account, which can be referred to as one-factor authentication. In other instances, the security protocol can require two-factor authentication, which provides additional security by requiring verification using a trusted client device used to access the service. Account recovery mechanisms that use alternative stored information (e.g., answers to security questions) can provide for recovering access to the user account in the event that a user cannot provide the proper credentials or prove possession of the trusted client device; however, such stored information is vulnerable to cyber-theft or misuse by untrusted third parties. Moreover, encrypted data associated with a user account can be inaccessible without access to a decryption key, which may be unavailable to provide to the user. Thus, there exists a need for improved techniques to provide a user mechanisms to recover access to a user account and/or to encrypted data with assistance from one or more trusted custodian devices.

SUMMARY

The embodiments described herein set forth techniques for establishing a custodial relationship between a user device and one or more custodian devices for the purpose of recovering access to a user account and/or to encrypted data. In some cases, a custodian device provides assistance to effect access recovery. Privacy of the user account and encrypted data is maintained by the recovery mechanism described herein. The user account can be associated with a cloud network service, e.g., iCloud®, and the encrypted data can be stored, at least in part, at one or more servers of the cloud network service. In some cases, the user data uses end-to-end encryption. The cloud network service cannot access the user's encrypted data. The user device and the one or more custodian devices can each be associated with respective user accounts of the cloud network service. In some embodiments, the user device and the one or more custodian devices are manufactured by a common original equipment manufacturer (OEM), e.g., Apple Inc. The user device establishes the custodial relationship with a custodian device using a server of the cloud network service. Cryptographic material to recover access to the user account and/or to recover access to encrypted user data can be generated in part by the server and in part by the user device. Part of the cryptographic material can be stored at the custodian device and another part of the cryptographic material can be stored at the server. A user can authenticate with the server and with the custodian device to obtain access to the stored cryptographic material in order to recover access to the user account and/or to access encrypted user data stored at the server (and/or at an associated server) of the cloud network service. Anonymity of the custodian device is achieved, at least in part, by using an anonymous (opaque) identifier generated by the server and associated with the custodian device and user account for the purposes of user account and user data recovery. Custodian devices check for integrity of their respective stored cryptographic material at regular intervals and report results of the integrity check to the user device.

Other aspects and advantages of the application will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
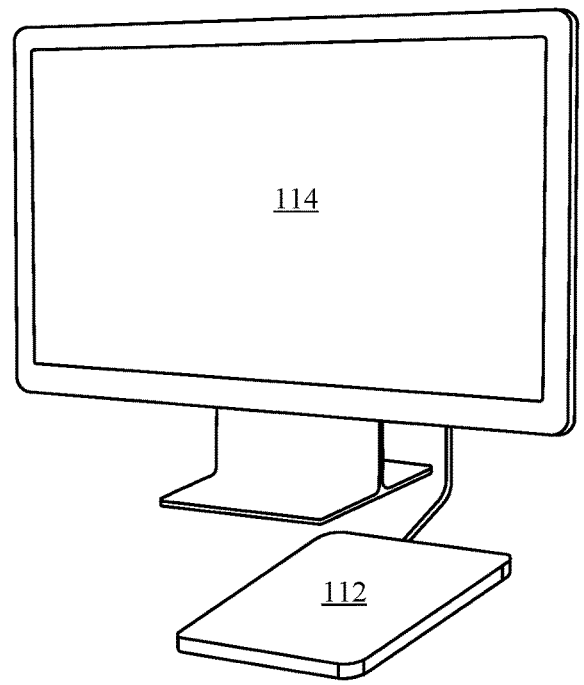
FIG. 1 illustrates various exemplary computing devices that can be configured to implement different aspects of the various techniques described herein, in accordance with some embodiments.
Figure 1:
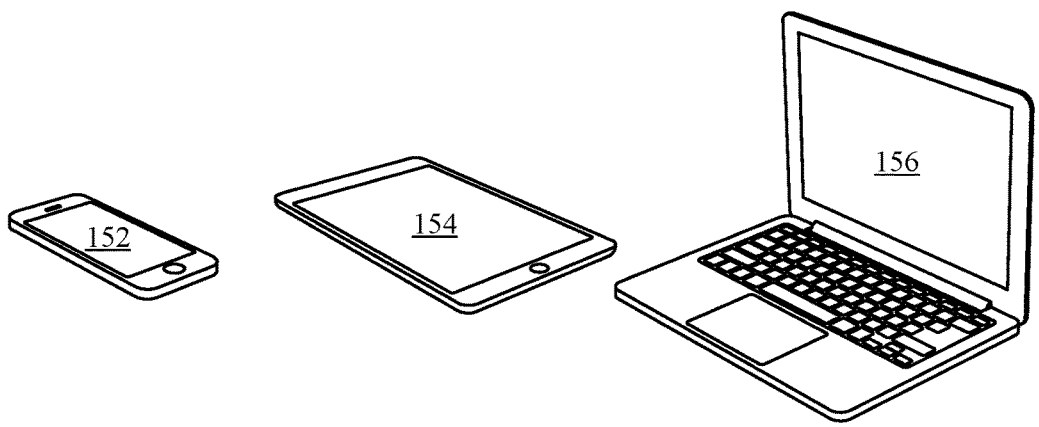

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Users entrust service providers with a vast amount of personal data that is stored on various servers and accessible over a network such as the Internet. The service providers are responsible to implement techniques that promote the protection of certain private information included in the personal data. For example, some user accounts may be associated with a user's home address, phone number, or even social security number. The personal data could be used to steal a user's identity or other unscrupulous purposes that could harm the user. Various technologies exist for providing online security to protect data associated with a user account. Improvements to these technologies are needed to enhance a user experience and/or improve the security of data. However, improving security, such as by requiring more complex credentials or using multi-factor authentication, can degrade the user experience as credentials become harder to remember or a user is required to complete more complex security protocols.

Notably, a user account can be associated with various client devices known to belong to a particular user. These "trusted" client devices, such as a user's mobile phone or laptop computer, can provide one factor of authentication when a user attempts to access data corresponding to a particular user account using the trusted client device. Other factors of authentication can also be used to provide additional security. For example, the user can be prompted to provide additional credentials using the trusted client device. Some client devices can also include various sensors that can be used to verify the identity of the user using biometric data, such as a fingerprint.

However, users may not always be able to access a service using the trusted client device. For example, a user may be locked out of the trusted client device. A user may forget or lose access to credentials for access to a user account without having access to the trusted client device. A user can also lose the trusted client device. Moreover, a user store encrypted data at a cloud network service. In some instances, the user encrypts data at the user device and stores the encrypted data on one or more servers of the cloud network service. In some instances, the user data is end-to-end encrypted. Access to the encrypted data can require the user to recall or otherwise access a decryption key, and, for privacy reasons, the cloud network service can be unable to decrypt the encrypted data for the user. To assist the user to recover access to a user account managed by a cloud network service or to encrypted data stored at the cloud network service, the user can designate one or more custodian devices with which to store cryptographic material and that can assist in account recovery and/or user data recovery.

Techniques described herein allow for establishing a custodial relationship between a user device, associated with a user account, and one or more custodian devices, associated with separate accounts, for the purpose of recovering access to the user account and/or to encrypted data, with assistance provided by at least one of the custodian devices to effect access recovery. The user account can be associated with a cloud network service, e.g., iCloud®, and the encrypted data can be stored, at least in part, at one or more servers of the cloud network service. The one or more custodian devices can each be associated with their own respective user accounts of the cloud network service separate from the user account for which access recovery assistance is established. In some embodiments, the user device and the one or more custodian devices are manufactured by a common original equipment manufacturer (OEM), e.g., Apple Inc.

The user device establishes the custodial relationship with a custodian device using a server of the cloud network service. Cryptographic material to recover access to the user account, e.g., an account recovery key, can be generated by the server, while cryptographic material to recover access to encrypted user data, e.g., a data recovery key, can be generated by the user device. Part of the cryptographic material, e.g., the account recovery key and/or a first portion of the data recovery key, can be stored at the custodian device and part of the cryptographic material, e.g., the account recovery key and/or a second portion of the data recovery key, can be stored at the server of the cloud network service. A user can authenticate with the server and with the custodian device to obtain access to the stored cryptographic material in order to recover access to the user account using the account recovery key and/or to access encrypted user data stored at the server (and/or at an associated server) of the cloud network service using the data recovery key. Anonymity of the custodian device is achieved, at least in part, by using an anonymous (opaque) identifier (ID) generated by the server and associated with the custodian device and user account for the purposes of user account recovery and user data recovery. The anonymous ID is maintained separately from a respective user account associated with the custodian device to ensure privacy of the custodial relationship between the user device and the custodian device. Custodian devices can check for integrity of their respective stored cryptographic material at regular intervals and report results of the integrity check to the user device. The user device can determine at regular intervals the integrity of the stored cryptographic material to ensure user account access recovery and/or user data access recovery can be achieved using the stored cryptographic material. In some embodiments, access to account recovery and/or user data recovery is constrained by embargo periods and/or by transparency notifications sent to the user device (and/or to other user devices associated with the user account) to mitigate account takeover attempts or other actions by a custodian and/or by a third-party.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates various computing devices that can be configured to implement different aspects of the techniques described herein, in accordance with some embodiments. The computing devices shown in FIG. 1 can be configured to access a user account via a user device 110. As used herein, a "user account" can refer to a particular account, profile, data structure, or the like corresponding to a user that is associated with a service provided by a service provider having a number of unique users. For example, user accounts can be associated with digital distribution platforms and a corresponding service configured to deliver applications or multimedia content to one or more user devices 110. User accounts can also be associated with other types of services, such as, but not limited to, mobile banking services, communications services, data storage services, health information services, and the like. A service provider can maintain different user accounts for a number of different users, each user account corresponding to a unique user identifier assigned to a particular user. The user account can also be associated with credentials, such as a username and password, which enable a user device 110 to access the user account through the service.

In some embodiments, a user account can be associated with one or more user devices 110. A particular user may own or control a mobile phone 152, a tablet computer 154, a laptop computer 156 and/or a desktop computer 114 with an input mechanism 112, and the user can choose to associate each of the user devices 110 with a common user account for access to a particular service, e.g., a cloud network service such as iCloud®.

A service provider can provide means for a user to associate a user device 110 with the user account. For example, a service provider can enable a user to connect to the user account from a user device 110 using credentials associated with the user account that are provided to the user. The credentials can include a username and password configured to access the user account. In some embodiments, the service provider can also require a second form of authentication to verify that the user device 110 is maintained, owned, or otherwise controlled by the user. For example, the user could be asked to provide a phone number when the user or service provider sets up the user account. When a user device 110 attempts to access the user account, the user device 110 can prompt the user to enter a verification code supplied to the user via the phone number, such as via a voice message or a text message sent to the provided phone number. Entering the verification code using the user device 110 provides another level of security that the user device 110 is associated with the user. Should the user lose access to the user device 110, forget the password (or otherwise lose access to the credentials) to access the user account, the user can be unable to access the user account. The verification code provides an example of two-factor authentication. Additional, alternative second forms of authentication can also be used to verify the user of the user account to provide access to the user device 110.

Accordingly, FIG. 1 provides a high-level overview of various computing devices that can be configured to operate in concert to implement the various techniques set forth herein. A more detailed breakdown of these techniques will now be described below in conjunction with FIGS. 2-11.

Figure 2:
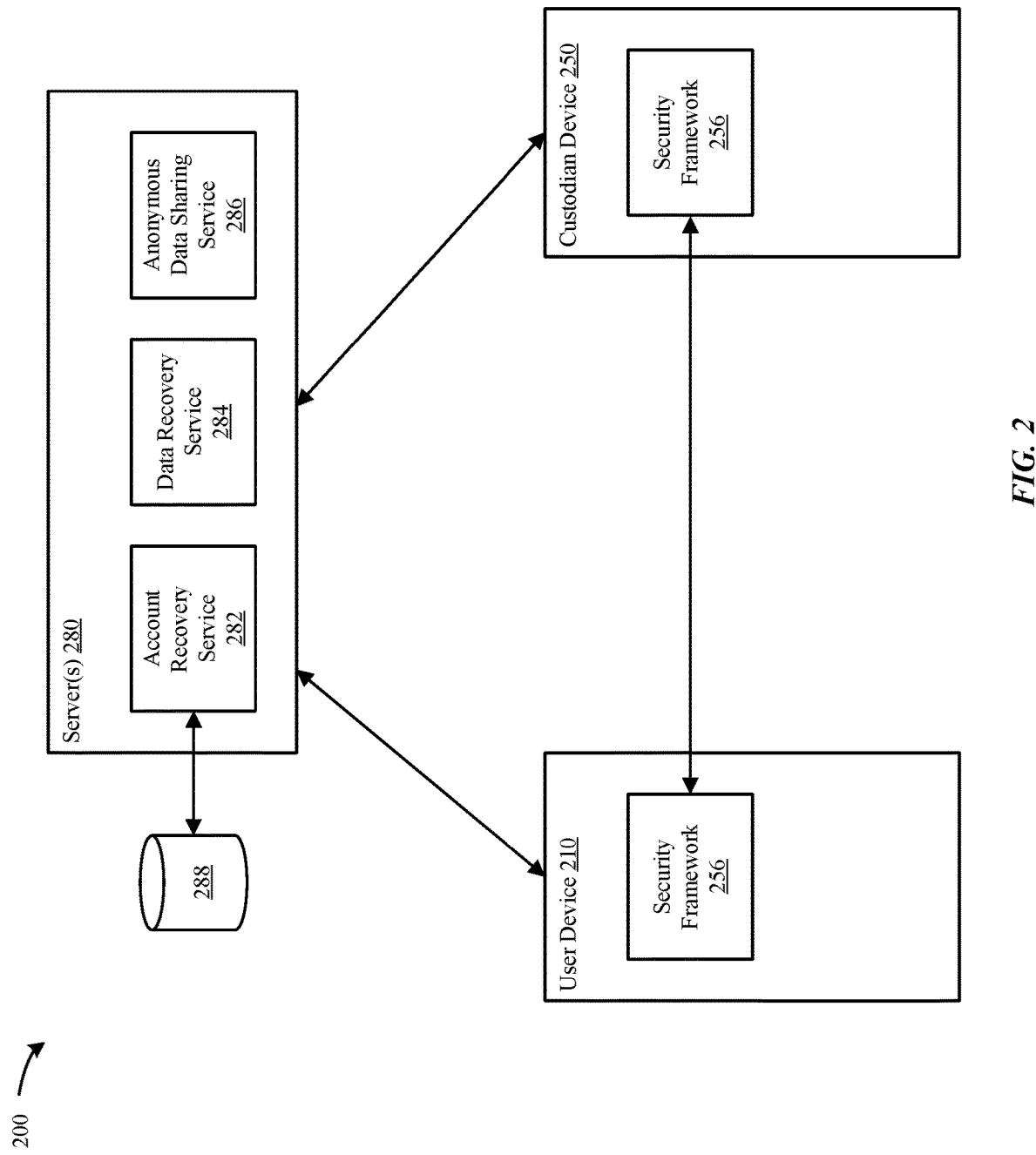
FIG. 2 illustrates an exemplary system configured to implement a protocol utilized to recover access to a user account and/or to encrypted user data associated with the user account, in accordance with some embodiments.

FIG. 2 illustrates an exemplary system 200 configured to implement a protocol used to recover access to a user account and/or to encrypted user data associated with the user account. A user device 210 can subscribe to a cloud network service maintained by one or more servers 280 that access a memory 288 that stores data related to multiple user accounts. The memory 288 can include a database of the user accounts. The memory 288 can also include data associated with the user accounts, such as data structures that store encrypted user data for the user device 210. The memory 288 can be local, such as a hard disc drive (HDD) or solid state drive (SSD) connected to the server, or remote, such as a virtual drive accessible through a storage server connected to a drive array or a cloud-based distributed storage service accessible over a network. The cloud network service provided by the servers 280 can require credentials to access a user account. The cloud network service can provide access to stored encrypted user data; however, decryption of the encrypted user data can require access to a data decryption key that is not known by cloud network service.

A user can seek to enable account recovery and/or user data recovery by establishing a custodial relationship with between the user device 210 and one or more custodian devices 250. The user device 210 can include a security framework 256 implemented as one or more processes configured to manage secure communication, e.g., to the cloud network service managed by the servers 280 and/or with the custodian device 250, which can implement a similar security framework 256. The servers 280 can include processes that implement an account recovery service 282, to allow a user to regain access to a user account, a data recovery service 284, to allow a user to regain access to encrypted user data, and an anonymous data sharing service 286, to allow data to be shared between the user device 210 and the custodian device 250 anonymously, e.g., without the servers 280 (or other elements of the cloud network service) having access to the shared data or to knowing an identity of the custodian device 250 with which the user device 210 has shared data. The server 280 can assist the user device 210 to establish the custodial relationship by providing an anonymous identifier to associate with the custodian device 250 and an account recovery key that the custodian device 250 can store for the user device 210 to later retrieve (or for the user to access using another user device 210 as described herein) in order to recover access to a user account. The server 280 can also assist the user device 210 by storing a second portion of a data recovery key, a first portion of which is stored by the custodian device 250. The user device 210 (or another user device 210) can later access the first and second portions of the data recovery key in order to regenerate a complete data recovery key in order to access encrypted data stored at the server 280 (or at associated servers 280 of the cloud network service).

Figure 3:
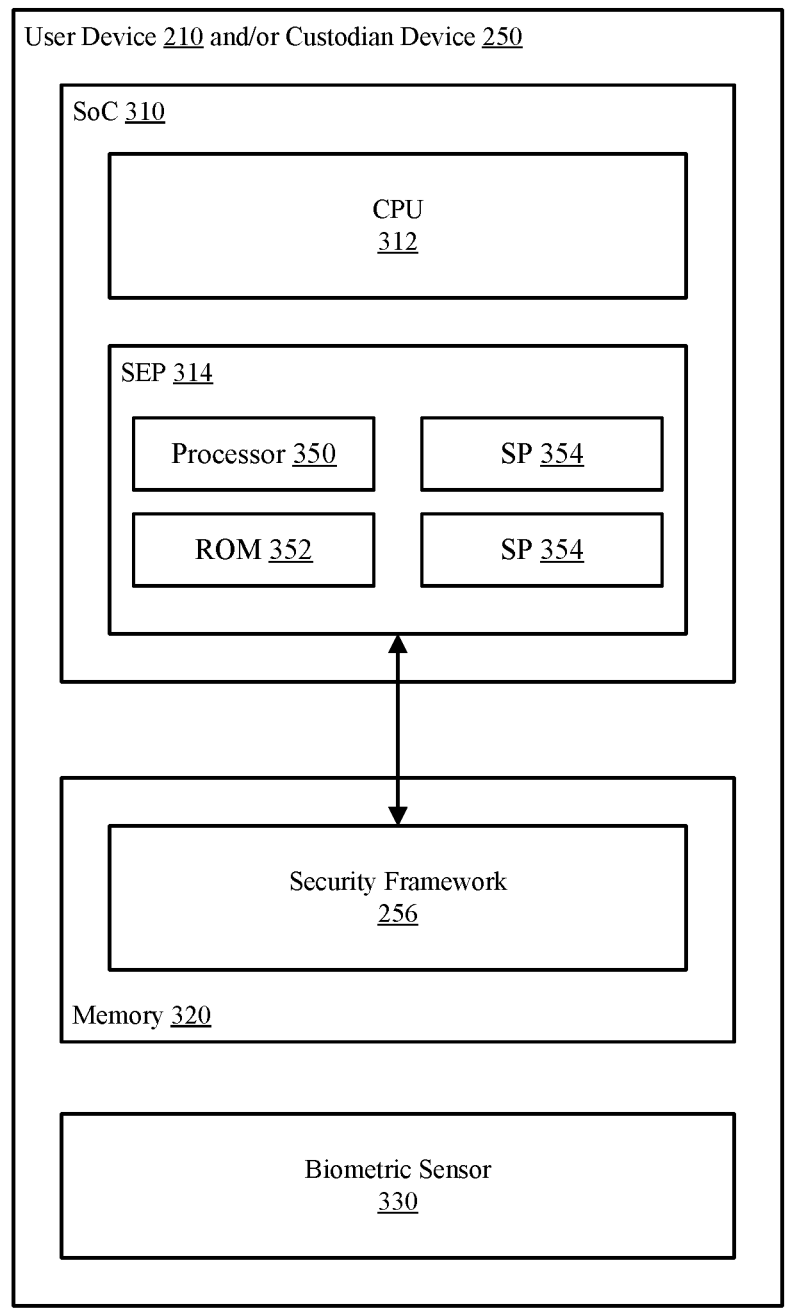
FIG. 3 illustrates exemplary components of a user device and/or a custodian device that uses a secure enclave processor to implement a private key infrastructure, in accordance with some embodiments.

FIG. 3 illustrates a diagram 300 of a user device 210 that includes a secure enclave processor (SEP) 314 to implement a private key infrastructure (PKI), in accordance with some embodiments. As shown in FIG. 3, the user device 210 includes a system-on-a-chip (SoC) 310, a memory 320, and a biometric sensor 330. The SoC 310 is an integrated circuit that includes a number of components including a central processing unit (CPU) 312 and a SEP 314. The SEP 314 is a secure circuit that generates and maintains public and private keys utilized to perform cryptographic operations requested by other units (e.g., CPU 312) of the SoC 310. The CPU 312 executes instructions implemented as various software stored in the memory 320. The memory 320 includes the security framework 256. Although not shown, the memory 320 can also include an operating system and one or more applications. In some embodiments, the security framework 256 utilizes the SEP 314 to verify the identity of a user using the biometric sensor 330. The biometric sensor 330 can be a fingerprint sensor configured to collect biometric data that comprises fingerprint information provided by a user by placing one or more fingers on the fingerprint sensor. In other embodiments, the biometric sensor 330 includes at least an image sensor and a depth sensor configured to collect biometric information that comprises an image of a user's face and a depth map associated with the image, respectively. In some embodiments, communications between SEP 314 and biometric sensor 330 can be encrypted using a key shared between SEP 314 and the biometric sensor 330 such that another circuit (e.g., CPU 312) is unable to view communicated biometric data.

In some embodiments, the security framework 256, executing on the CPU 312 receives a notification from an application and initiates a procedure to confirm the identity of a user using the SEP 314. The security framework 256 can implement an API, called by the application, that causes the security framework 256 to request identity confirmation by the SEP 314 utilizing the biometric sensor 330. Upon receiving the request from the security framework 256, the SEP 314 requests biometric data from the biometric sensor 330. In some embodiments, the biometric data collected by the biometric sensor 330 is encrypted and stored in a secure memory allocated to the SEP 314. The SEP 314 can then decrypt the biometric data and compare the collected biometric data against stored biometric data for a user of the user device 210. If the collected biometric data matches the stored biometric data, then the identity is confirmed and the SEP 314 returns a response to the security framework 256 that the identity of the user has been confirmed. Otherwise, the SEP 314 returns a response to the security framework 256 that the identity of the user has not been confirmed.

In some embodiments, the SEP 314 includes one or more processors 350, a secure read-only memory (ROM) 352, and one or more security peripherals 354. Processor 350 can execute securely loaded software. For example, the secure ROM 352 can include software executed by the processor 350. One or more of the security peripherals 354 can include an external interface, which can be connected to a source of software (e.g., ROM 352 or memory 320). In some embodiments, the software can be encrypted and loaded into a secure portion of memory 320 allocated to the SEP 314. A memory controller for the SoC 310 can prevent units other than the SEP 314 (e.g., CPU 312) from accessing this secure portion of memory 320. Although software stored in the secure portion of memory 320 is more secure than software stored in other portions of memory 320, the secure software can still be prevented from directly accessing/obtaining stored private keys, which are stored in hardware, such as in secure ROM 352 only accessible within the SEP 314. In other embodiments, the processor 350 may be omitted from the SEP 314, which implements all functions in various security peripherals 354.

The SEP 314 is isolated from other components of the SoC 310 except for a carefully controlled interface. In some embodiments, the security framework 256, via the CPU 312, communicates with the SEP 314 through a secure mailbox mechanism implemented as part of the interface. Through the secure mailbox mechanism, external components of the SoC 310 transmit messages to an inbox, where SEP 314 can read and interpret the messages, and determine what actions, if any, to take in response to the message. Response messages from the SEP 314 are transmitted back to the external components of the SoC 310 through an outbox. It will be appreciated that software outside of the SEP 314 is prevented from directly accessing any internal components of SEP 314.

Figure 4:
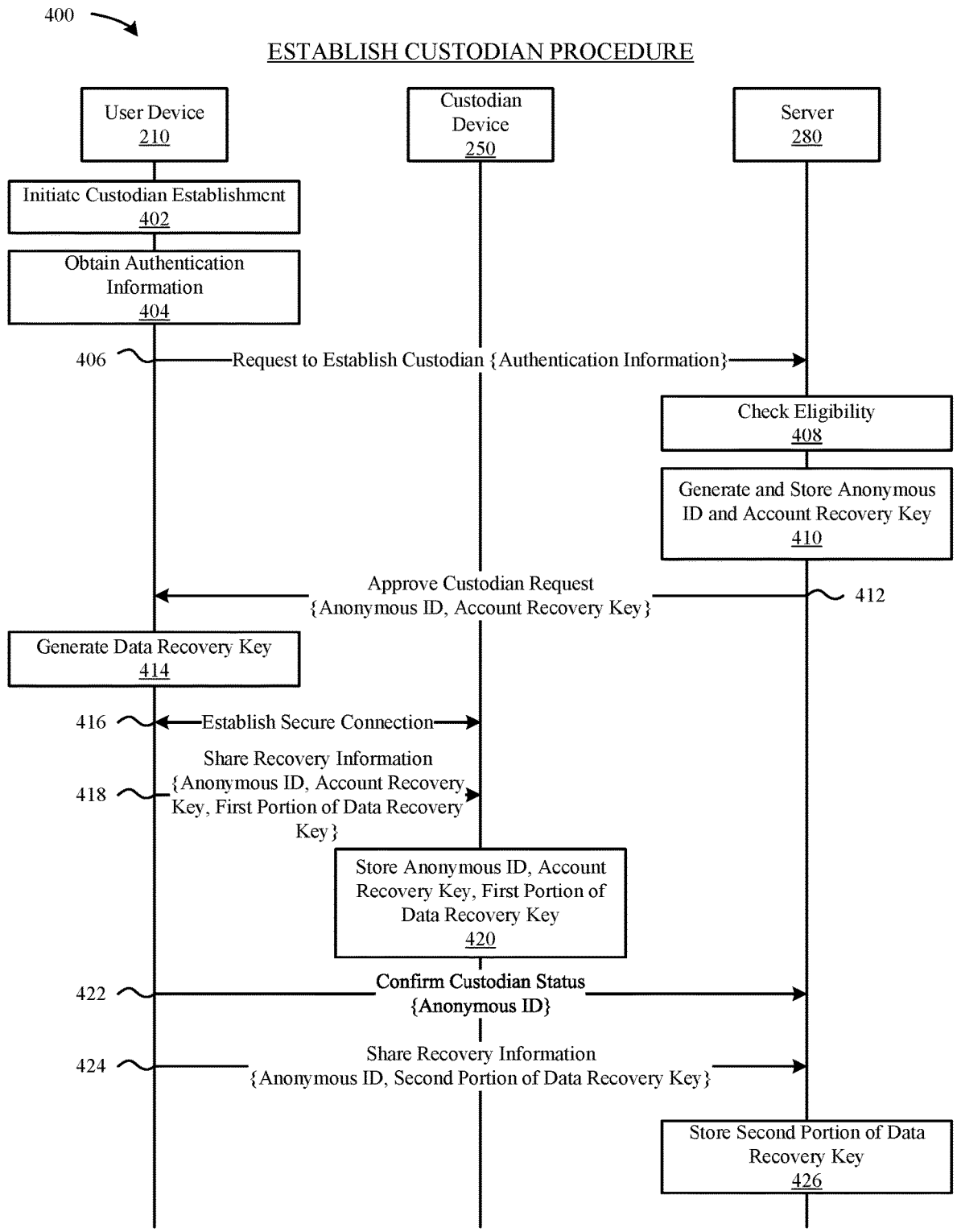
FIG. 4 illustrates an exemplary set of actions to establish a custodial relationship between a user device and a custodian device, in accordance with some embodiments.

FIG. 4 illustrates a diagram 400 of an exemplary set of actions performed to establish a custodial relationship between a user device 210 and a custodian device 250, in accordance with some embodiments. At 402, a user of the user device 210 can initiate a procedure to establish the custodial relationship between the user device 210 and the custodian device 250, e.g., by providing an input to the user device 210. At 404, the user device 404 can obtain authentication information to authenticate the user of the user device 210, e.g., a password associated with a user account for which recovery access can be established with the custodian device 250, a password to access the user device 210, and/or biometric sensor 330 input to verify identity of the user. At 406, the user device 210 can send a message to the server 280 to request establishing a custodian (or a set of custodians) to assist with future account recovery and/or data recovery, the message including at least a portion of the authentication information or an indication of authentication of a user of the user device 210. At 408, the server 280 can determine eligibility of the user of a user account, the user account, the user device 210 and/or a set of user devices 210 associated with the user account. In some embodiments, the user account must be in good standing with a cloud network service provided at least in part by the server 280 in order for establishment of the custodial relationship to continue. In some embodiments, the user device 210 must have a particular hardware version (e.g., from a set of approved hardware versions) and/or a particular software version (e.g., from a set of approved software versions) for the custodial relationship to continue. In some embodiments, one or more user devices 210 (or all user devices 210) associated with the user account must satisfy a set of hardware and software criteria in order for the establishment of the custodial relationship to continue. When eligibility of the user, the user account, and the user device 210 are satisfied, at 410, the server 280 can generate an anonymous identifier (ID) to associate with the custodian device 250 and an account recovery key 410 to allow for access to the user account. The server 280 can store copies of the anonymous ID and the account recovery key 410, e.g., in memory 288, and associate the stored anonymous ID and account recovery key with the user device 210 and/or with the user account associated with the user device 210. In some embodiments, the request to establish a custodian includes a request to establish multiple custodians, and the server 280 can generate and store multiple pairs of unique anonymous IDs and account recovery keys as paired cryptographic material for each custodian device 250. At 412, The server 280 can send a message to the user device 210 approving the request to establish the custodial relationship and provide the anonymous ID and account recovery key pair to the user device 210 to use when establishing the custodial relationship with the custodian device 250. It is noted that the server 280 does not have knowledge of the specific custodian device 250 with which the user device 210 will establish the custodial relationship.

At 414, the user device 414 generates a data recovery key to use for accessing encrypted user data that can be stored at the cloud network service associated with the server 280. It is noted that the server 280 does not have access to the data recovery key and cannot decrypt the encrypted user data. At 416, the user device 210 establishes a secure connection with the custodian device 250. In some embodiments, the secure connection is established using an anonymous data sharing service provided by the cloud network service. The secure connection can use encryption to prevent third parties (including the cloud network service) from accessing decrypted versions of the shared data. In some embodiments, the anonymous data sharing service allows the user device 210 to share encrypted data privately and securely with the custodian device 250 without the cloud network service having knowledge of the identity of the custodian device 250, a user account associated with the custodian device 250, or a specific user associated with the custodian device 250. At 418, the user device shares with the custodian device 250 account recovery information, including the anonymous ID, the account recovery key generated by and obtained from the server 280, and a first portion of the data recovery key generated by the user device 210. At 420, the custodian device 250 stores locally on the custodian device 250 the anonymous ID, the account recovery key, and the first portion of the data recovery key provided by the user device 210. It is noted that the custodian device 250 is unable to decrypt encrypted user data using only the first portion of the data recovery key. At 422, the user device 210 sends a message to the server 280 confirming establishment of the custodial relationship with the custodian device 250, the message including the anonymous ID associated with the custodian device 250. At 424, the user device 210 sends to the server 280 additional recovery information including the anonymous ID and a second portion of the data recovery key. At 426, the server 280 stores the second portion of the data recovery key for later retrieval. The second portion of the data recovery key can be stored in a data record created previously when storing the anonymous ID and account recovery key at 410 by the server 280. The anonymous ID associated with the custodian device 250, the account recovery key for access to the user account, and the second portion of the data recovery key can be stored together for later access by the user device 210 or by another user device (as shown further in FIGS. 6A and 6B) to recover access to the user account and/or to the encrypted user data. It is noted that the server 280 cannot decrypt the encrypted user data using only the second portion of the data recovery key.

Figure 5:
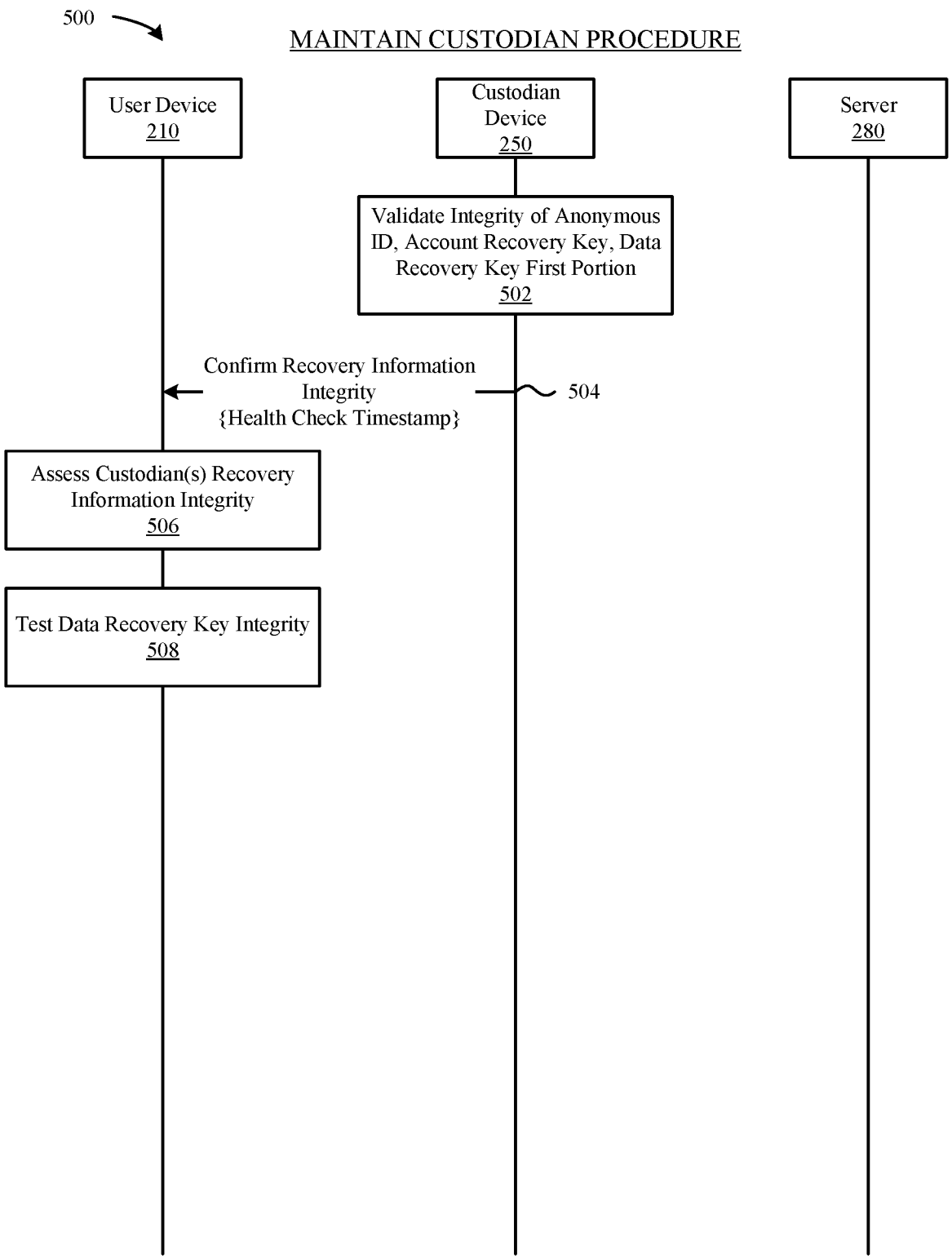
FIG. 5 illustrates an exemplary set of actions to maintain a custodial relationship between a user device and a custodian device, in accordance with some embodiments.

FIG. 5 illustrates a diagram 500 of an exemplary set of actions to maintain a previously created custodial relationship between a user device 210 and a custodian device 250, in accordance with some embodiments. The custodian device 250 can check at regular intervals, e.g., weekly, the integrity of the account recovery information provided previously by the user device 210 and stored locally at the custodian device 250. At 502, the custodian device 250 validates the integrity of the anonymous ID, the account recovery key, and/or the first portion of the data recovery key. In some embodiments, the custodian device 250 calculates a hash using at least a portion of the account recovery information at the time of storing the account recovery information. In some embodiments, the custodian device 250 re-calculates a hash using at least a portion of the stored account recovery information and compares the re-calculated hash to the previously calculated and stored hash to determine integrity of the stored account recovery information. When the re-calculated hash matches the previously stored hash, the custodian device 250 can update an indication of the currency, e.g., a most recent timestamp of successful integrity checking, of the account recovery information. At 504, the custodian device 250 can confirm integrity of the account recovery information, e.g., by sending a health check timestamp value to the user device 210, which the user device 210 can store. The user device 210 can regularly assess (at its own weekly or other time period interval) integrity of account recovery information stored separately at one or more custodian devices 250. At 508, the user device 210 can perform a local test to determine integrity of a stored data recovery key to ensure that the encrypted data (or a portion thereof) can be successfully accessed using the stored data recovery key.

Figure 6A:
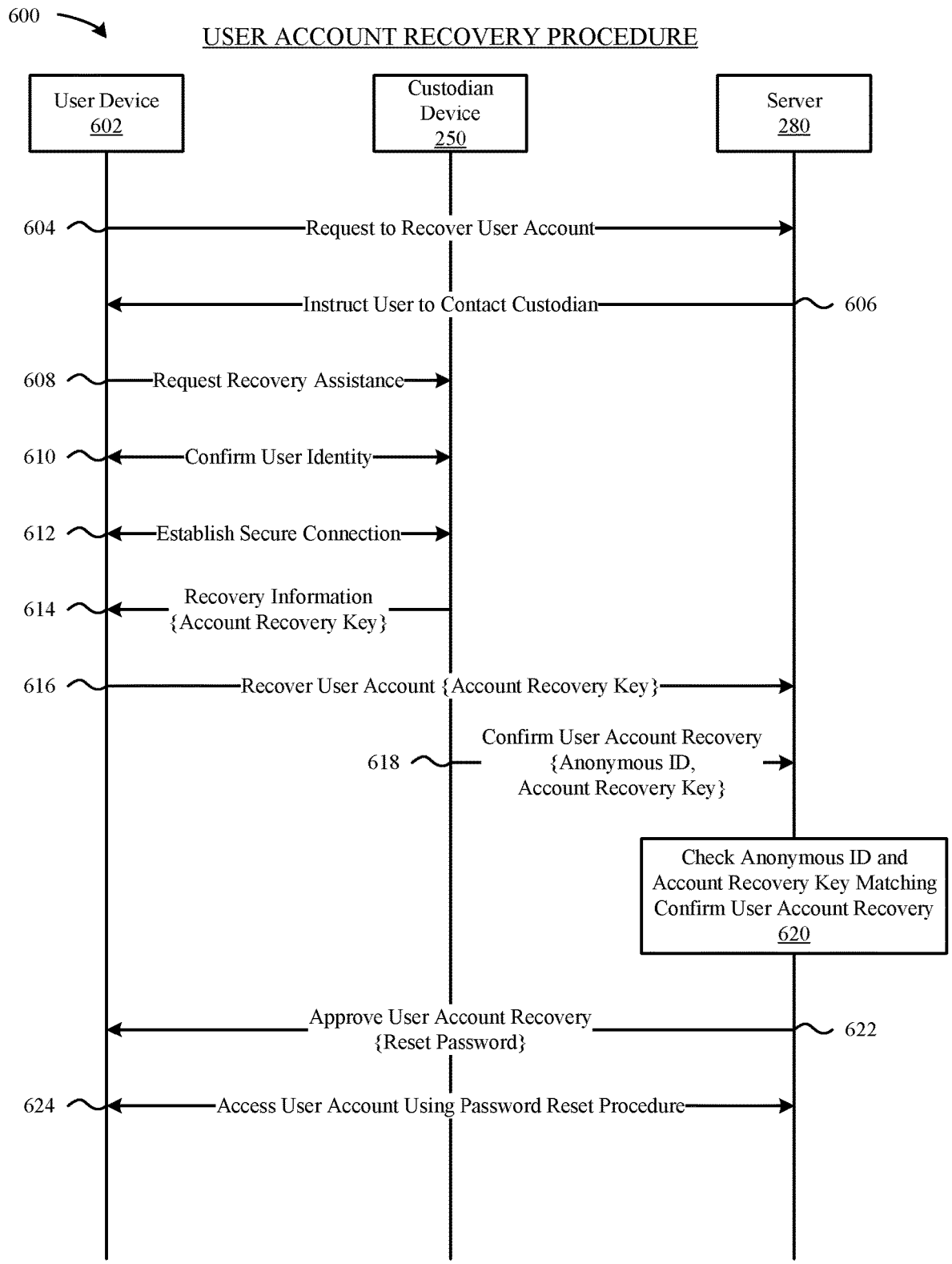
FIG. 6A illustrates an exemplary set of actions to recover access to a user account by a user device assisted by a custodian device, in accordance with some embodiments.

FIG. 6A illustrates a diagram 600 of an exemplary set of actions to recover access to a user account by a user device 602 assisted by a custodian device 250, in accordance with some embodiments. It is noted that the user device 602 used to recover access to the user account can be the same user device 210 as previously used to establish the custodial relationship with the custodian device 250 or a different user device 602. The user device 602 can be associated with the same user account of the cloud network service associated with the server 280 as the previous user device 210. At 604, the user device 602 sends a message to the server 280 to request recovery of access to the user account associated with the user device 602. At 606, the server 280 responds to the request with instructions for the user of the user device 602 to contact one (or more) of their associated custodian devices 250, without naming or pointing to a specific custodian device 250. The server 280 may have knowledge of how many custodian devices 250 are associated with the user device 602 but may lack specific knowledge of user identities of the custodian devices 250 to preserve anonymity of the custodian devices 250 to the server 280. At 608, in accordance with the instructions received from the server 280, a user of the user device 602 sends a message to the custodian device 250 requesting assistance to recover access to the user account. Communication of the request for assistance to the custodian device 250 (or to the owner/custodian of the custodian device 250) can be via an out-of-band mechanism, e.g., a separate phone call, message, email, or other communication path that is not visible to the server 280 or the cloud network service. In some embodiments, the communication of the request for assistance request is from the user device 602 to the custodian device 250. In some embodiments, the communication of the assistance request is between a user of the user device 602 to a user of the custodian device 250 without direct involvement of the user device and/or the custodian device 250. At 610, a user (custodian) of the custodian device 250 confirms identity of the user of the user device 602, e.g., via a separate communication channel such as a phone call, text message, in-person interaction, etc. In some embodiments, the custodian device 250 also confirms an identity of the custodian device 250 to the user device 602. In some embodiments, the custodian device 250 displays information, e.g., a six-digit code, to a user (custodian) of the custodian device 250, which the custodian provides to a user of the user device 602, via an out-of-band communication channel such as a phone call, text message, email, or other communication between the owner/custodian of the custodian device 250 and the user of the user device 602 to confirm identity of the user and/or of the user device 602. At 612, after confirmation of the user identity and/or identity of the user device 602, the user device 602 and the custodian device 250 establish a secure connection between them. At 614, the custodian device 250 provides to the user device 602 account recovery information, e.g., the previously stored account recovery key. At 616, the user device 602 provides to the server a message to recover the user account, the message including the account recovery key obtained from the custodian device 250. At 618, the custodian device 250 provides to the server 280 a message confirming the user account recovery request of the user device 602, where the message includes the anonymous ID associated with the custodian device 250 and the account recovery key. At 620, the server 280 checks validity of the account recovery key and anonymous ID, e.g., by checking that the anonymous ID and account recovery key match a previously stored record of the custodial relationship between the user device 210 and the custodian device 250 (e.g., stored by the server 280 at 410 in FIG. 4). When the server 280 successfully validates the user account recovery information provided by the user device 602 and the custodian device 250, the server 280, at 622, sends a message to the user device 602 approving recovery of access to the user account associated with the user device 602 (and associated with the user device 210). In some embodiments, the message includes a reset password and/or a link (or other instructions) for resetting a password for access to the user account associated with the user devices 602, 210. At 624, the user device 602 uses a password reset procedure to regain access to the user account.

Figure 6B:
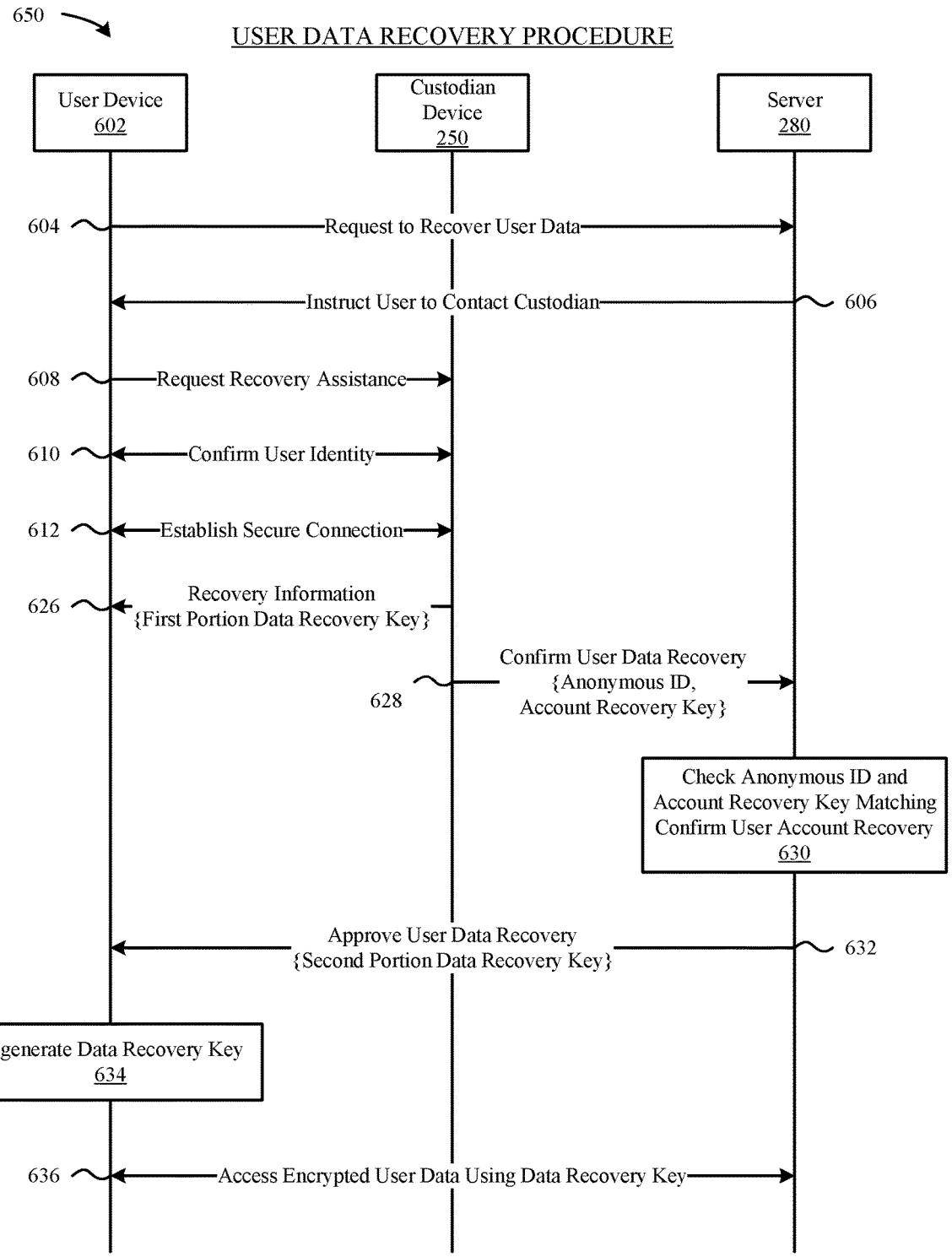
FIG. 6B illustrates an exemplary set of actions to recover access to encrypted user data by a user device assisted by a custodian device, in accordance with some embodiments.

FIG. 6B illustrates a diagram 650 of an exemplary set of actions to recover access to encrypted user data by a user device assisted by a custodian device, in accordance with some embodiments. It is noted that the user device 602 used to recover access to the encrypted user data can be the same user device 210 as previously used to establish the custodial relationship with the custodian device 250 or a different user device 602. The user device 602 can be associated with the same user account of the cloud network service associated with the server 280 as the previous user device 210. At 604, the user device 602 sends a message to the server 280 to request recovery of access to the encrypted user data that is stored for a user account associated with the user device 602. At 606, the server 280 responds to the request with instructions for the user of the user device 602 to contact one (or more) of their associated custodian devices 250, without naming or pointing to a specific custodian device 250. The server 280 may have knowledge of how many custodian devices 250 are associated with the user device 602 but may lack specific knowledge of user identities of the custodian devices 250 to preserve anonymity of the custodian devices 250 to the server 280. At 608, in accordance with the instructions received from the server 280, the user device 602 sends a message to the custodian device 250 requesting assistance to recover access to the user account. At 610, a user (custodian) of the custodian device 250 confirms identity of the user of the user device 602, e.g., via a separate communication channel such as a phone call, text message, in-person interaction, etc. In some embodiments, the custodian device 250 also confirms an identity of the custodian device 250 to the user device 602. In some embodiments, the custodian device 250 displays information, e.g., a six-digit code, to a user (custodian) of the custodian device 250, which the custodian provides to a user of the user device 602, via an out-of-band communication channel such as a phone call, to confirm identity of the user device 602. At 612, after confirmation of the user identity and/or identity of the user device 602, the user device 602 and the custodian device 250 establish a secure connection between them. At 626, the custodian device 250 provides to the user device 602 recovery information, e.g., the previously stored first portion of the data recovery key. At 628, the custodian device 250 provides to the server 280 a message confirming the user data recovery request of the user device 602, where the message includes the anonymous ID associated with the custodian device 250 and the account recovery key. It is noted that the custodian device 250 does not provide the first portion of the data recovery key to the server 280 to ensure that the encrypted user data remains inaccessible (or at least not decryptable) by the server 280. At 630, the server 280 checks validity of the account recovery key and anonymous ID, e.g., by checking that the anonymous ID and account recovery key match a previously stored record of the custodial relationship between the user device 210 and the custodian device 250 (e.g., stored by the server 280 at 410 in FIG. 4). When the server 280 successfully validates the user data recovery information provided by the custodian device 250, the server 280, at 632, sends a message to the user device 602 approving recovery of access to the encrypted user data associated with the user device 602 (and associated with the user device 210). The message includes the second portion of the data recovery key previously provided to the server 280 by the user device 210 and stored for recovery purposes. At 634, the user device 602 regenerates the data recovery key using the first portion of the data recovery key obtained from the custodian device 250 and the second portion of the data recovery key obtained from the server 280. At 636, the user device 602 uses the regenerated data recovery key to access at least a portion of the encrypted user data.

Sharing sensitive information between the user device 602, 210 and the custodian device 250, such as when establishing the custodial relationship as described for FIG. 4, when performing an account recovery procedure as described for FIG. 6A, or when performing a data recovery procedure as described for FIG. 6B, can use a secure, encrypted communication path between the user device 602 and the custodian device 250. This secure, encrypted communication path can conceal shared information from a cloud network server that provides, at least part, an anonymous cloud network based sharing service used for sharing the sensitive information between the user device 602, 210 and the custodian device 250. With anonymous sharing, the cloud network service can be unaware of identities of the specific parties, e.g., a user identity or other specific identity associated with the user device 602, 210 and/or an identity associated with the custodian device 250. In some embodiments, a user identity of the user device 602, 210 can be known to the cloud network service but an anonymized identity for the identity of the custodian device 250 with which information is shared can be not used to trace back to a known user identity of the custodian device 250. In some embodiments, the cloud network service can know how many users with which data is shared but the identities of the users with which data is shared by a user device 602, 210 can be not known. The user device 602, 210 can maintain an encrypted list of shared parties with which information is shared. A corresponding device, e.g., the custodian device 250, with which data is shared confidentially can also maintain an encrypted list of parties from which data is shared. Encryption keys to decrypt the respective device's lists of shared parties can be known to the respective devices and can be not known to the cloud network service. Lists of parties with which data is shared can be updated as required, e.g., when additional data is shared, when new parties are added to which data is shared, and/or when parties are dropped from sharing. Authentication for access to shared data can be restricted from using a known identifier for a user account, e.g., an Apple ID, or from using an identifier from which a known identifier for a user account can be determined. Sharing participants can sign requests for sharing information (e.g., sending and/or receiving such information) using a public encryption key provided by the sharing participant. In some embodiments, the public encryption key is anonymized. In some embodiments, data to be shared is stored at the cloud network service. An owner device, e.g., user device 602, 210, can know an identity for a sharing participant's device, e.g., custodian device 250, such as a phone number, an email address, etc. The owner device can request from a server of the cloud network server, e.g., server 280, a public key. The public key can be used to bootstrap a shared encryption key that provides direct access to the shared, encrypted data maintained at the cloud network service. The shared key can be encrypted with the participant's public key. It is noted that the participant's public key can be anonymized such that it is not visible in metadata to the cloud network service. An identifier of the participant and an unencrypted version of the participant's public key can be not visible to the cloud network service. An encrypted version of the participant's public key can be provided to the owner device for the purposes of sharing data between the owner device and the participant's device. The encrypted version of the participant's public key can be communicated to the participant device via an out-of-band communication path from the owner device (or via another secure communication path, such as in a separately encrypted secure message). The participant's device can decrypt the encrypted participant key using its own corresponding private key to obtain the shared decryption key. In some embodiments, the participant device can generate an anonymous identifier and send a share acceptance request to a server of the cloud network service, the request including the anonymous identifier. The request from the participant device inquires of the server information regarding encrypted shared data available for the participant device associated with the anonymous identifier (where the encrypted shared data is decryptable by the participant device). In some embodiments, an encrypted list of shared data for a participant device is stored at a server of the cloud network service. In some embodiments, each distinct shared data is associated with a unique anonymous identifier.

Figure 7:
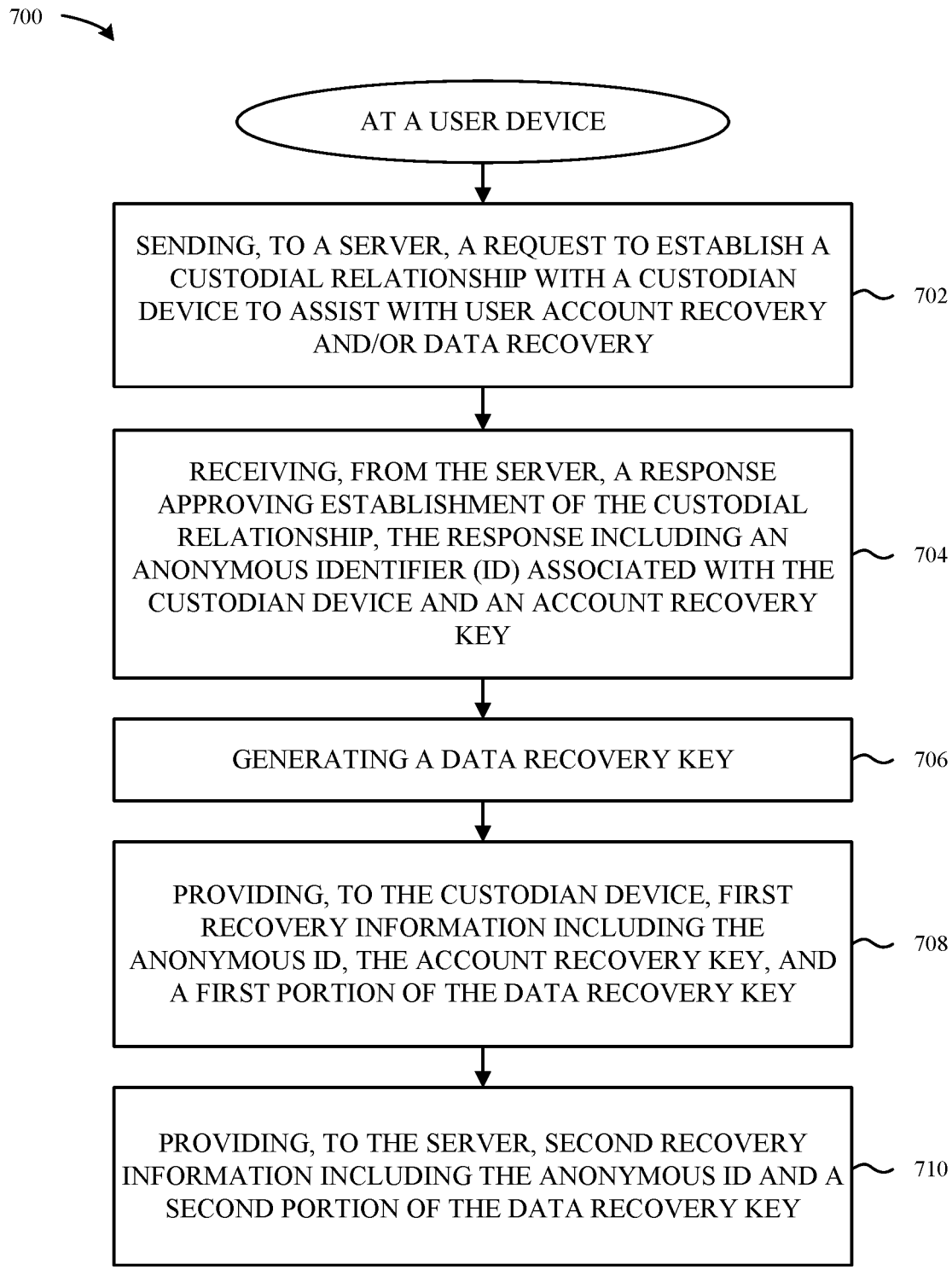
FIG. 7 illustrates a flowchart of an exemplary method to establish a custodial relationship between a user device and a custodian device, in accordance with some embodiments.

FIG. 7 illustrates a flowchart 700 of an exemplary method to establish a custodial relationship between a user device 210 and a custodian device 250, in accordance with some embodiments. At 702, the user device 210 sends, to a server 280, a request to establish a custodial relationship with the custodian device 250 to assist with user account recovery and/or data recovery. At 704, the user device 210 receives, from the server 280, a response approving establishment of the custodial relationship between the user device 210 and the custodian device 250, the response including an anonymous ID associated with the custodian device 250 and an account recovery key. At 706, the user device 210 generates a data recovery key. At 708, the user device 210 provides, to the custodian device 250, first recovery information including the anonymous ID, the account recovery key, and a first portion of the data recovery key. At 710, the user device 210 provides, to the server 280, second recovery information including the anonymous ID and a second portion of the data recovery key.

In some embodiments, the first recovery information is provided to the custodian device 250 by the user device 210 via a secure, encrypted connection. In some embodiments, the secure, encrypted connection includes a cloud network based, anonymous data sharing service. In some embodiments, the method further includes the user device 210 sending, to the server 280, confirmation of establishment of the custodial relationship with the custodian device 250, where the confirmation includes the anonymous ID. In some embodiments, the method further includes the user device 210 providing, to the server 280 with the request to establish the custodial relationship with the custodian device 250, authentication information to authenticate a user associated with a user account of the user device 210. In some embodiments, the account recovery key enables the user at least in part to recover access to the user account. In some embodiments, the data recovery key enables the user at least in part to recover access to encrypted data stored at the user device 210 or at a cloud network based service associated with the user account.

Figure 8:
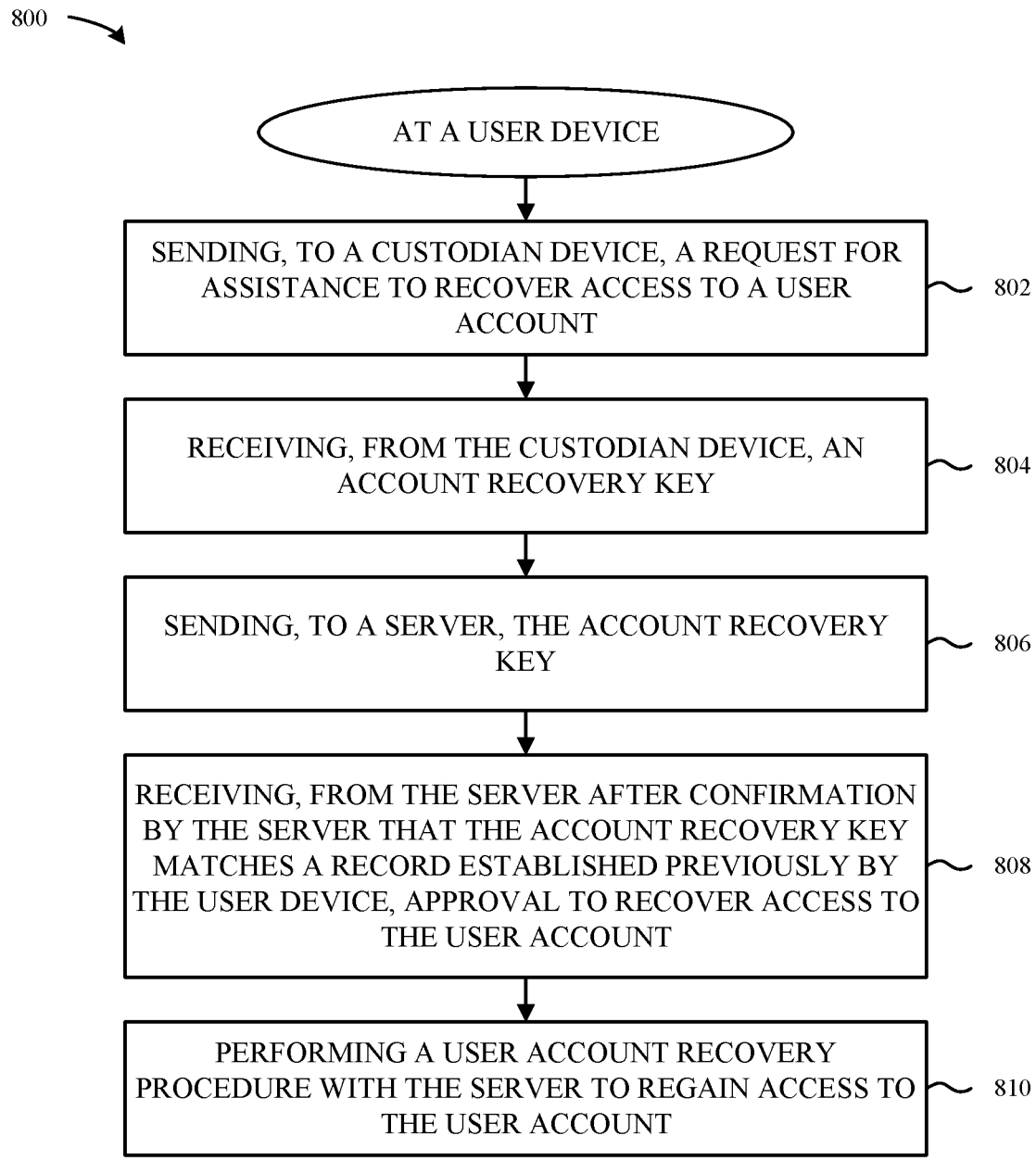
FIG. 8 illustrates a flowchart of an exemplary method to recover access to a user account by a user device assisted by a custodian device, in accordance with some embodiments.

FIG. 8 illustrates a flowchart 800 of an exemplary method to recover access to a user account by a user device 602, 210 assisted by a custodian device 250, in accordance with some embodiments. At 802, the user device 602, 210 sends, to the custodian device 250, a request for assistance to recover access to a user account associated with the user device 602, 210. At 804, the user device 602, 210 receives, from the custodian device 250, an account recovery key. At 806, the user device 602, 210 sends, to a server 280, the account recovery key. At 808, the user device 602, 210 receives, from the server 280 after confirmation by the server 280 that the account recovery key matches a record established previously by the user device 210, approval to recover access to the user account. At 810, the user device 602, 210 performs a user account recovery procedure with the server 280 to regain access to the user account.

In some embodiments, the method further includes the user device 602, 210: i) sending, to the server 280, prior to sending the request for assistance to the custodian device 250, a request to recover access to the user account, and ii) receiving, from the server 280, instructions to contact the custodian device 250 to assist with recovering access to the user account. In some embodiments, the approval to recover access to the user account includes a reset password. In some embodiments, the user device 602, 210 performs the user account recovery procedure with the server 280 using the reset password to re-establish a new password for access to the user account. In some embodiments, the method further includes the user device 602, 210 confirming identity of a user of the user device 602, 210 with the custodian device 250 before receiving the account recovery key. In some embodiments, the method further includes the user device 602, 210 establishing a secure connection with the custodian device 250, where the account recovery key is received by the user device 602, 210 via the secure connection.

Figure 9:
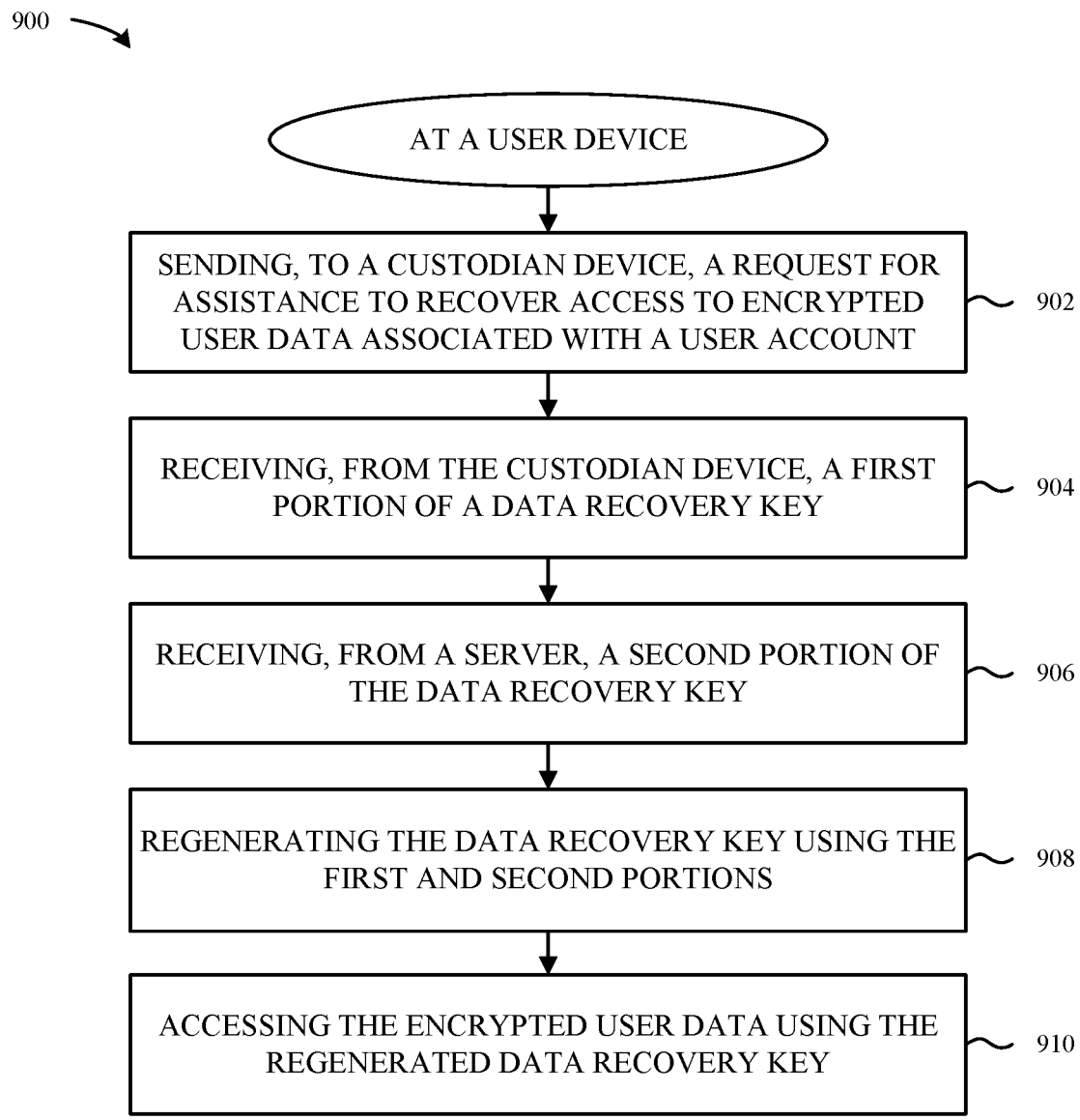
FIG. 9 illustrates a flowchart of an exemplary method to recover access to encrypted user data by a user device assisted by a custodian device, in accordance with some embodiments.

FIG. 9 illustrates a flowchart 900 of an exemplary method to recover access to encrypted user data by a user device 602, 210 assisted by a custodian device 250, in accordance with some embodiments. At 902, the user device 602, 210 sends, to the custodian device 250, a request for assistance to recover access to encrypted user data associated with a user account. At 904, the user device 602, 210 receives, from the custodian device 250, a first portion of a data recovery key. At 906, the user device 602, 210 receives, from a server 280, a second portion of the data recovery key. At 908, the user device 602, 210 regenerates the data recovery key using the first and second portions. At 910, the user device 602, 210 accesses at least a portion of the encrypted user data using the regenerated data recovery key.

In some embodiments, the second portion of the data recovery key is received by the user device 602, 210 from the server 280 after the server 280 confirms an anonymous identifier (ID), received by the server 280 from the custodian device 250, matches a corresponding anonymous ID stored by the server 280 for the user account. In some embodiments, the method further includes the user device 602, 210: i) sending, to the server 280 prior to sending the request for assistance to the custodian device 250, a request to recover access to the encrypted user data associated with the user account, and ii) receiving, from the server 280, instructions to contact the custodian device 250 to assist with recovering access to encrypted user data associated with the user account. In some embodiments, the method further includes the user device 602, 210 confirming identity of a user of the user device 602, 210 with the custodian device 250 before receiving the first portion of the data recovery key. In some embodiments, the method further includes the user device 602, 210 establishing a secure connection with the custodian device 250, where the first portion of the data recovery key is received by the user device 602, 210 via the secure connection.

In some embodiments, the methods illustrated in FIGS. 6A and 6B can be combined to allow the user device 602, 210 to perform user account recovery and data recovery together, e.g., by combining separate requests and separate responses, as illustrated in FIGS. 6A and 6B for user account recovery and data recovery respectively, into combined request messages and combined response messages.

Figure 10:
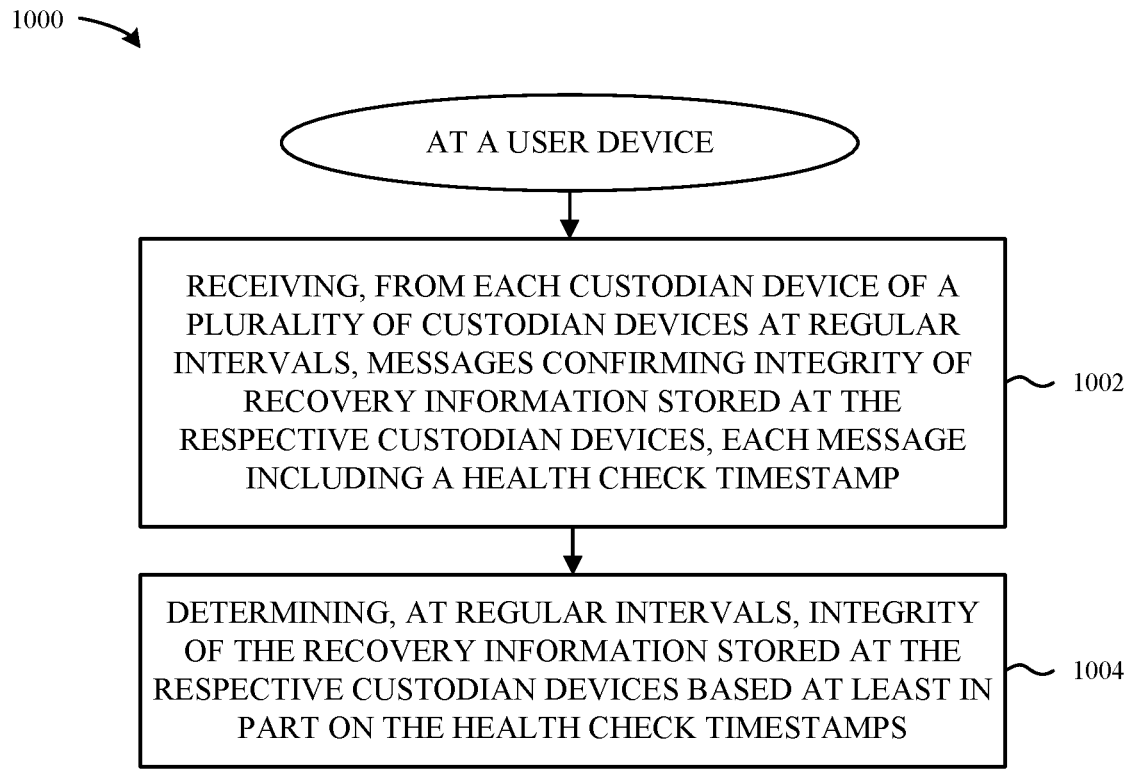
FIG. 10 illustrates a flowchart of an exemplary method to maintain a custodial relationship between a user device and multiple custodian devices for recovering access to a user account and encrypted data associated with the user account, in accordance with some embodiments.

FIG. 10 illustrates a flowchart 1000 of an exemplary method to maintain a custodial relationship between a user device 210 and a plurality of custodian devices 250 for recovering access to a user account and encrypted data associated with the user account, in accordance with some embodiments. At 1002, the user device 210 receives, from each custodian device 250 of multiple custodian devices 250 at regular intervals, messages confirming integrity of recovery information stored at the respective custodian device 250, each message including a health check timestamp. At 1004, the user device 210 determines, at regular intervals, integrity of the recovery information stored at the respective custodian devices 250 based at least in part on the health check timestamps. In some embodiments, the method further includes the user device 210 performing an integrity test using a first portion and a second portion of a data recovery key stored at the user device 210 to ensure the data recovery key is usable for accessing the encrypted data associated with the user account.

Figure 11:
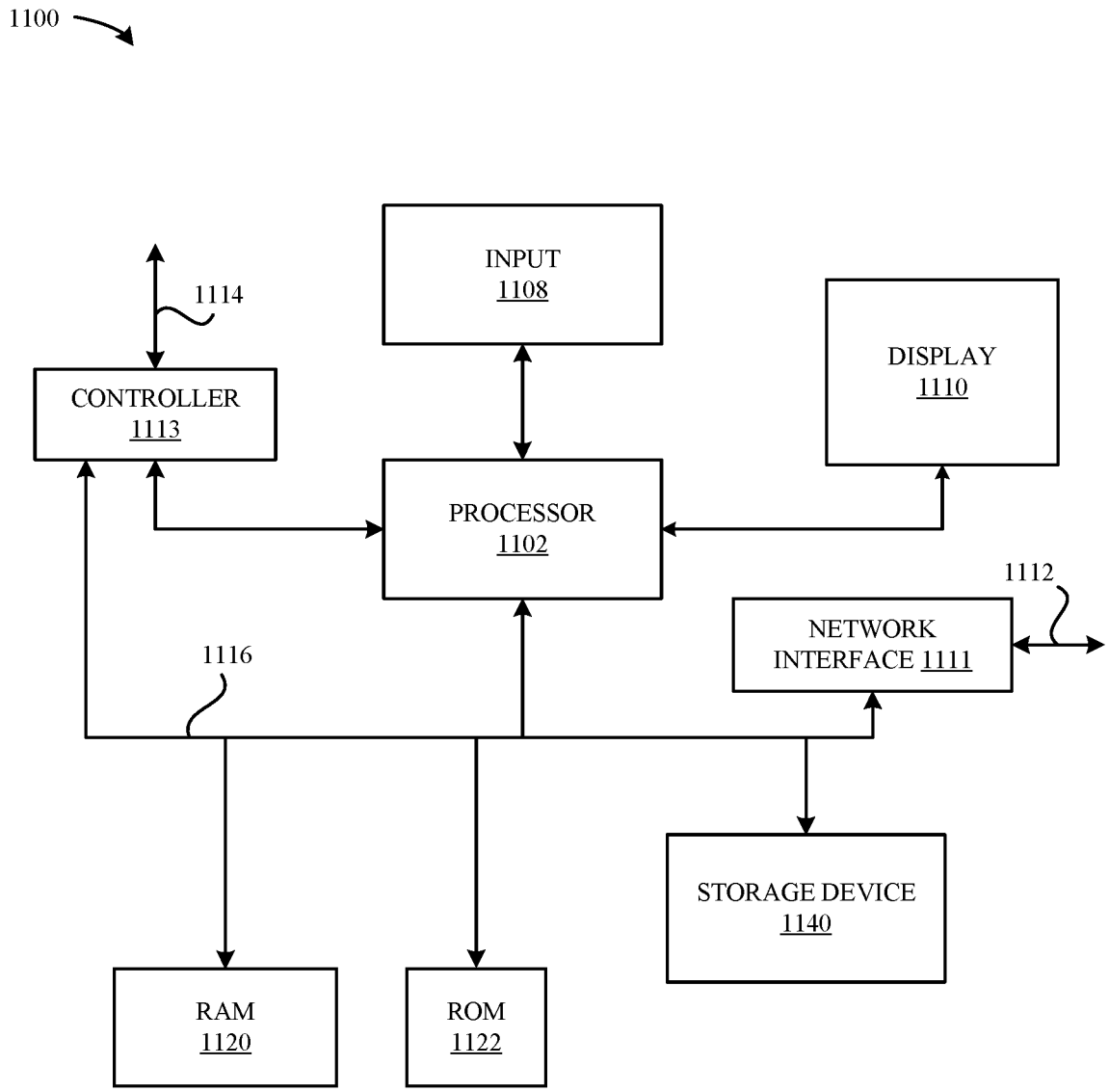
FIG. 11 illustrates a detailed view of an exemplary computing device that can be used to implement the various apparatus and/or methods described herein, in accordance with some embodiments.

FIG. 11 illustrates a detailed view of an exemplary computing device 1100 that can be used to implement the various apparatus and/or methods described herein, in accordance with some embodiments. In particular, the detailed view illustrates various components that can be included in the computing devices illustrated in FIGS. 1 and 2 and/or described herein. For example, one or more of the mobile phone 152, tablet computer 154, laptop computer 156, desktop computer 114, user device 210, custodian device 250, server 280, user device 602, or any other device including any network device, computing device, and/or server computing device described herein can include the components of computing device 1100.

As shown in FIG. 11, the computing device 1100 includes a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to present visual information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include a wireless transceiver.

In some embodiments, the processor 1102 can be embodied in a variety of forms. For example, the processor 1102 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it will be appreciated that the processor 1102 can include two or more processors. The processors can be in operative communication with each other and can be collectively configured to perform one or more functionalities of the computing device 1100 as described herein. In some embodiments, the processor 1102 can be configured to execute instructions that can be stored in the RAM 1120 or that can be otherwise accessible to the processor 1102.

The computing device 1100 also include a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random-Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for establishing a custodial relationship between a user device and a custodian device to assist with user account and data recovery, the method comprising, by the user device:
   receiving, from a server, an anonymous identifier (ID) associated with the custodian device and an account recovery key;
   generating a data recovery key;
   providing, to the custodian device, recovery information including the anonymous ID, the account recovery key, and a first portion of the data recovery key; and
   providing, to the server, a second portion of the data recovery key.

2. The method of claim 1, wherein the recovery information is provided to the custodian device via a secure, encrypted connection.

3. The method of claim 2, wherein the secure, encrypted connection comprises a cloud network based, anonymous data sharing service.

4. The method of claim 1, further comprising:
   sending, to the server, confirmation of establishment of the custodial relationship with the custodian device, where the confirmation includes the anonymous ID.

5. The method of claim 1, further comprising:
   providing, to the server, authentication information to authenticate a user associated with a user account of the user device.

6. The method of claim 5, wherein the account recovery key enables the user at least in part to recover access to the user account.

7. The method of claim 5, wherein the data recovery key enables the user at least in part to recover access to encrypted data stored at the user device or at a cloud network-based service associated with the user account.

8. A non-transitory computer readable storage medium configured to store instructions that, when executed by a processor included in a user device, cause the user device to establish a custodial relationship between the user device and a custodian device to assist with user account and data recovery, by carrying out steps that include:
   receiving, from a server, an anonymous identifier (ID) associated with the custodian device and an account recovery key;
   generating a data recovery key;
   providing, to the custodian device, recovery information including the anonymous ID, the account recovery key, and a first portion of the data recovery key; and
   providing, to the server, a second portion of the data recovery key.

9. The non-transitory computer readable storage medium of claim 8, wherein the recovery information is provided to the custodian device via a secure, encrypted connection.

10. The non-transitory computer readable storage medium of claim 9, wherein the secure, encrypted connection comprises a cloud network based, anonymous data sharing service.

11. The non-transitory computer readable storage medium of claim 8, wherein the steps further include:
    sending, to the server, confirmation of establishment of the custodial relationship with the custodian device, where the confirmation includes the anonymous ID.

12. The non-transitory computer readable storage medium of claim 8, wherein the steps further include:
    providing, to the server, authentication information to authenticate a user associated with a user account of the user device.

13. The non-transitory computer readable storage medium of claim 12, wherein the account recovery key enables the user at least in part to recover access to the user account.

14. The non-transitory computer readable storage medium of claim 12, wherein the data recovery key enables the user at least in part to recover access to encrypted data stored at the user device or at a cloud network-based service associated with the user account.

15. A user device configured to establish a custodial relationship between the user device and a custodian device to assist with user account and data recovery, the user device comprising:
    one or more memory devices for storing instructions; and
    a processor configured to execute the instructions to:
      receive, from a server, an anonymous identifier (ID) associated with the custodian device and an account recovery key;
      generate a data recovery key;
      provide, to the custodian device, recovery information including the anonymous ID, the account recovery key, and a first portion of the data recovery key; and
      provide, to the server, a second portion of the data recovery key.

16. The user device of claim 15, wherein the recovery information is provided to the custodian device via a secure, encrypted connection.

17. The user device of claim 16, wherein the secure, encrypted connection comprises a cloud network based, anonymous data sharing service.

18. The user device of claim 15, wherein the processor is further configured to:
    send, to the server, confirmation of establishment of the custodial relationship with the custodian device, where the confirmation includes the anonymous ID.

19. The user device of claim 15, wherein the processor is further configured to:
    provide, to the server, authentication information to authenticate a user associated with a user account of the user device.

20. The user device of claim 19, wherein the account recovery key enables the user at least in part to recover access to the user account.

* * * * *